(12) United States Patent
Hahn et al.

(10) Patent No.: US 11,808,287 B2
(45) Date of Patent: Nov. 7, 2023

(54) CONSTANT FLOW REGULATOR

(71) Applicants: Michael L. Hahn, Fort Collins, CO (US); Brett Flannery, Poplar Grove, IL (US)

(72) Inventors: Michael L. Hahn, Fort Collins, CO (US); Brett Flannery, Poplar Grove, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/958,727

(22) Filed: Oct. 3, 2022

(65) Prior Publication Data

US 2023/0107881 A1 Apr. 6, 2023

Related U.S. Application Data

(60) Provisional application No. 63/252,031, filed on Oct. 4, 2021.

(51) Int. Cl.
*F16K 11/07* (2006.01)
*F15B 13/04* (2006.01)

(52) U.S. Cl.
CPC .......... *F15B 13/0402* (2013.01); *F16K 11/07* (2013.01); *F16K 2200/201* (2021.08); *F16K 2200/204* (2021.08)

(58) Field of Classification Search
CPC .............. F16K 11/07; F16K 2200/204; F16K 2200/201; F16K 2200/402; F15B 13/0402; F15B 13/0438; F15B 2211/50536; F02C 7/22; F02C 9/36; F01D 17/26

See application file for complete search history.

(56) References Cited

U.S. PATENT DOCUMENTS

| | | | |
|---|---|---|---|
| 3,984,979 A * | 10/1976 | Budzich | F15B 13/04 91/462 |
| 6,102,001 A | 8/2000 | McLevige | |
| 2012/0199206 A1 | 8/2012 | Futa et al. | |
| 2018/0038503 A1 | 2/2018 | Spickard et al. | |
| 2021/0079855 A1 | 3/2021 | Cervelli et al. | |
| 2021/0277920 A1 | 9/2021 | Futa et al. | |

* cited by examiner

*Primary Examiner* — Kelsey E Cary
(74) *Attorney, Agent, or Firm* — Reinhart Boerner Van Deuren P. C.

(57) ABSTRACT

Embodiments of the disclosure relate to a system designed to compensate for flow disturbances when changing a flow rate in the system. The system includes a flow source device having an inlet and an outlet. The inlet is configured to receive fluid at a first pressure, and the outlet is configured to output the fluid at a second pressure that is higher than the first pressure. The system also includes a fluid control device having an inlet port and a drain port. The inlet port of the fluid control device is configured to receive flow from the outlet of the flow source device. Further, the system includes a constant flow regulator configured to provide a leakage flow to a drain output. The constant flow regulator is configured to decrease the leakage flow in response to the drain port of the fluid control device.

20 Claims, 3 Drawing Sheets

CONSTANT FLOW REGULATOR

CROSS-REFERENCE TO RELATED PATENT APPLICATIONS

This patent application claims the benefit of U.S. Provisional Patent Application No. 63/252,031, filed Oct. 4, 2021, the entire teachings and disclosure of which are incorporated herein by reference thereto.

FIELD

This invention generally relates to a fluid flow system and, in particular, to a fluid flow system providing an adjustable leak path to reject disturbances associated with slewing of an actuator.

BACKGROUND

In order to control a variable flow device, electrohydraulic servo valves (EHSV) are often used to control the amount of flow going through the variable flow device. For example, the variable flow device may be a variable displacement pump, and the EHSV may mechanically position a variable pumping member to increase or decrease the flow. In such systems, the EHSV often uses high pressure fluid on the outlet side of the variable flow device as a hydraulic fluid for creating the mechanical actuation to position the variable pumping member. This form of actuation creates a slew flow in the EHSV that causes a large disturbance in the outlet flow of the variable flow device.

One prior attempt to address this issue is known from U.S. Pat. No. 6,102,001, filed on Dec. 4, 1998, and issued on Aug. 15, 2000, the entire contents of which are incorporated herein by reference thereto. In the '001 patent, a controlled leak was provided through the EHSV from the outlet flow of the variable flow device to the inlet side of the variable flow device. The leakage flow helps to compensate some for the slew flow of the EHSV. However, the compensation provided by the controlled leak of the '001 patent is fixed and could not adjust for differences in EHSV actuator velocity (resulting, e.g., from frictional forces) or for changes in the load of the variable flow device.

In view of the foregoing, Applicant has identified a need in the art for a way to provide an adjustable compensation for slew flow of an EHSV actuator to minimize flow disturbances on the outlet side of a variable flow device.

BRIEF SUMMARY

Embodiments of the presently disclosed invention address the foregoing problems and issues associated with conventional variable flow systems. In particular, embodiments of the presently disclosed flow system utilize a pressure regulator to set a relatively constant flow across a tunable orifice so that any slew flow to move an EHSV actuator is compensated by having the regulator close, reducing its leakage, to maintain the constant flow across the orifice and therefore constant flow out of the pumping unit. The only input to the compensation provided by the pressure regulator is actual slew flow from the EHSV, making it insensitive to any other changes or disturbances in the system. Because the only input to the compensating pressure regulator is the slew flow for which the compensation is provided, the potential for error resulting from other system factors is substantially reduced or completely eliminated. Further, the orifice allows the system to be tunable for only the slew flow for which compensation is desired, thereby limiting the amount of additional leakage in the system. These and other advantages of the invention, as well as additional inventive features, will be apparent from the description of the invention provided herein.

According to an aspect, embodiments of the present disclosure provide a system designed to compensate for flow disturbances associated with a changing flow rate in the system. In embodiments, the system includes a flow source device having an inlet and an outlet. The inlet is configured to receive fluid at a first pressure, and the outlet is configured to output the fluid at a second pressure that is higher than the first pressure. The system also includes a fluid control device having an inlet port and a drain port. The inlet port of the fluid control device is configured to receive flow from the outlet of the flow source device. Further, the system includes a constant flow regulator configured to provide a leakage flow to a drain output. The constant flow regulator is configured to decrease the leakage flow in response to the drain port of the fluid control device.

In one or more embodiments of the system, the constant flow regulator includes a pressure regulating valve (PRV). Further, the PRV includes a PRV inlet in fluid communication with the outlet of the flow source device and a PRV outlet in fluid communication with a first fluid line extending from the drain port of the fluid control device. In addition, the constant flow regulator incorporates a restriction positioned on a second fluid line downstream of the PRV outlet and the first fluid line.

In one or more embodiments of the system, the system includes an actuator actuated by the fluid control device, an electro-hydraulic servo valve (EHSV), which uses fluid from the flow source device to actuate the actuator.

In one or more embodiments of the system, the EHSV includes a valve body defining a valve bore, the inlet port, the drain port, a first working port, and a second working port. The EHSV also includes a valve member disposed within the valve bore. The valve member is configured to translate within the valve bore to provide communication between the inlet port and the first working port and between the second working port and the drain port, or between the first working port and the drain port and between the inlet port and the second working port. Further, the fluid flow from the inlet port through the first working port actuates the actuator in a first direction, and the fluid flow from the inlet port through the second working port actuates the actuator piston in a second direction opposite to the first direction.

In one or more embodiments of the system, the system includes a position sensor configured to detect the movement of the actuator.

In one or more embodiments of the system, the actuator is a linear actuator.

In yet another embodiment of the system, the actuator is a rotary actuator.

In one or more embodiments of the system, the actuator is disposed within a housing. The housing further includes a first chamber coupled to the first working port and a second chamber coupled to the second working port.

In one or more embodiments of the system, the constant flow regulator is configured to decrease the leakage flow in proportion to the fluid flow from the first or second working port to the drain port.

In one or more embodiments of the system, the fluid control device is driven by a stepper motor, a direct drive motor, or a hydro-mechanical pilot valve.

In one or more embodiments of the system, the flow source device includes a variable displacement pump.

In one or more embodiments of the system, the variable displacement pump is a vane pump.

In yet another embodiment of the system, the variable displacement pump is a piston pump.

In one or more embodiments of the system, the flow source device is a fuel metering system.

According to another aspect, embodiments of the present disclosure provide a method of compensating for flow disturbances associated with a changing flow rate in a fluid flow system. In embodiments of the method, fluid at a first pressure is received at an inlet of a flow source device. The fluid is output at a second pressure higher than the first pressure from an outlet of the flow source device. A portion of the fluid at the second pressure is received through an inlet port of a fluid control device to actuate an actuator. A leakage flow is provided to a drain output through a constant flow regulator. The constant flow regulator is configured to decrease the leakage flow in response to a drain flow from a drain port of the fluid control device when the actuator is actuated.

In one or more embodiments of the method, the constant flow regulator includes a pressure regulating valve (PRV) and a restriction. The leakage flow is provided from a PRV inlet in fluid communication with the outlet of the flow source device through a PRV outlet in fluid communication with a first fluid line extending from an outlet port of the fluid control device. Further, the flow is restricted from the PRV outlet and the drain port of the fluid control device.

In one or more embodiments of the method, the fluid control device is electro-hydraulically driven, and the portion of the fluid through the inlet port of the fluid control device is used to move the actuator.

In one or more embodiments of the method, the fluid control device includes a valve body defining a valve bore, the inlet port, the drain port, a first working port, and a second working port. The fluid control device further includes a valve member disposed within the valve bore. The valve member is translated within the valve bore to provide fluid communication between the inlet port and the first working port and between the second working port and the drain port, or between the first working port and the drain port and between the inlet port and the second working port. Further, the actuator is moved in a first direction when fluid flows from the inlet port through the first working port or in a second direction when fluid flows from the inlet port through the second working port.

In one or more embodiments of the method, the leakage flow is decreased through the constant flow regulator in proportion to the fluid flow from the first working port to the drain port or from the second working port to the drain port.

In one or more embodiments of the method, the actuator is linked to the flow source device, and a flow control member of the flow source device is moved in response to movement of the actuator.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Figure 1:
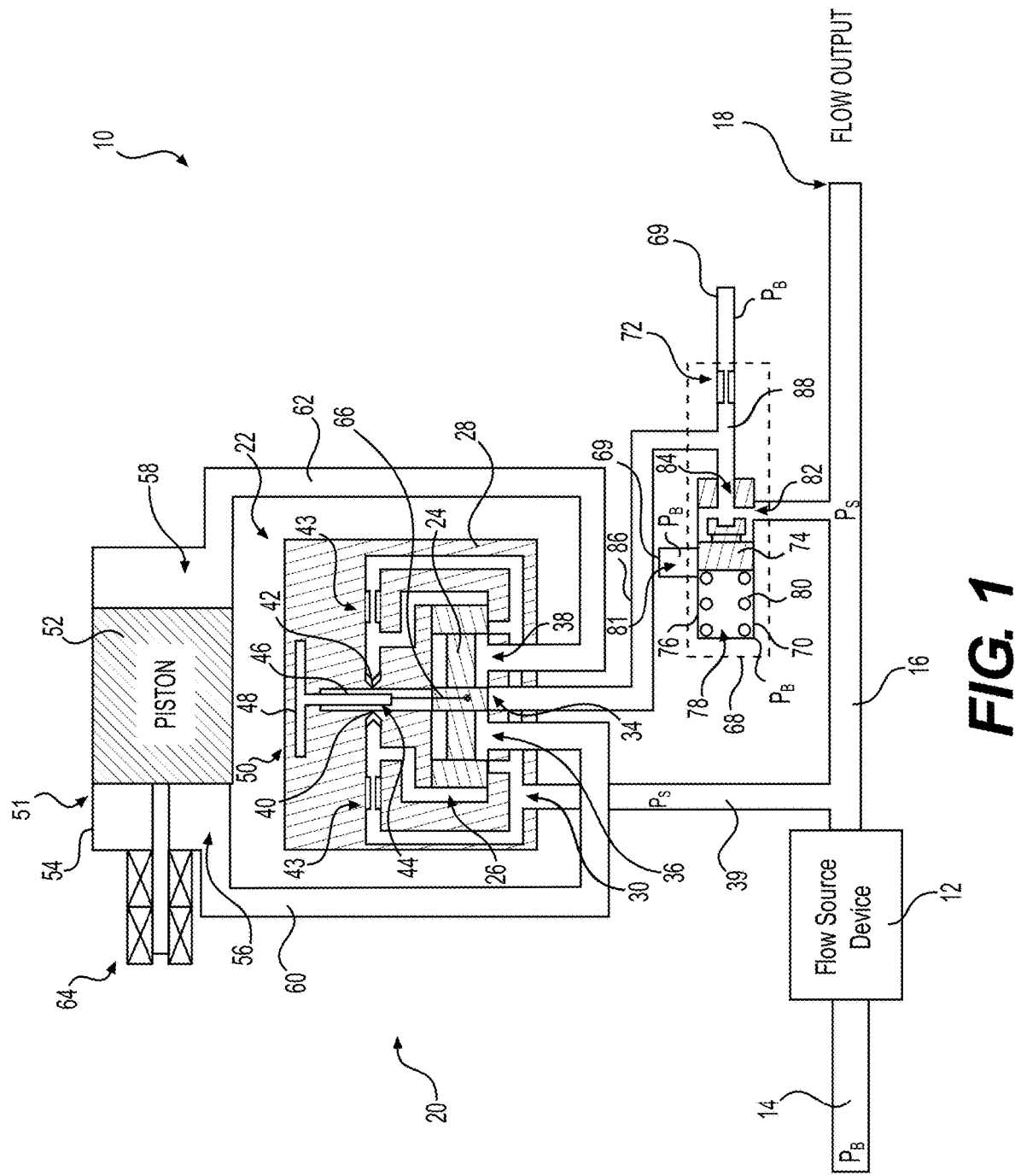
FIG. 1 is a schematic depiction of a variable flow system, according to an exemplary embodiment.

FIG. 1 depicts an embodiment of a flow system 10, such as a fuel control system (e.g., for an aircraft). The flow system 10 includes a flow source device 12 that receives low pressure fluid $P_B$ on a first fuel line 14, and the flow source device 12 ejects high pressure fluid $P_S$ on a second line 16. The high pressure fluid $P_S$ is provided to an output 18 through which the fluid is provided to a downstream process, such as a fuel manifold and combustion chamber (not shown) for an exemplary embodiment of a fuel system. In such embodiments, the pressure $P_S$ of the fluid may be set by nozzles of the fuel manifold that eject fuel into the combustion chamber. In embodiments, the downstream process may need fluid of variable pressure, and the flow source device 12 regulates the flow of the fluid.

In addition, the high pressure fluid $P_S$ ejected from the flow source device 12 is utilized by a fluid control device 20, depicted as an electrohydraulic servo valve (EHSV). While the fluid control device 20 is depicted as being electrohydraulically driven, the fluid control device 20 could instead be hydraulically driven or hydro-mechanically driven. For example, in embodiments, the fluid control device 20 may be driven by a stepper motor, direct drive motor, or hydro-mechanical pilot valve, among other possibilities. The fluid control device 20 includes an actuator control valve 22 having a valve member 24, such as a spool valve, disposed within a valve bore 26 of a valve body 28. The valve body 26 defines an inlet port 30 and a drain port 34 of the valve bore 26. The valve body 26 also defines a first working port 36 and a second working port 38. The inlet port 30 is in fluid communication with the high pressure fluid $P_S$ through a third line 39. The position of the valve member 24 within the valve bore 26 controls the flow of the high pressure fluid $P_S$ from the inlet port 30 to one of the respective first or second working ports 36, 38 and from the other of the working ports 36, 38 to the drain port 34.

More particularly, the actuator control valve 22 includes a first nozzle 40 and a second nozzle 42 that each receive high pressure fluid $P_S$ from the third line 39 through the inlet port 30 and through respective restrictions 43. The nozzles 40, 42 inject high pressure fluid into an actuator control valve chamber 44. Disposed within the valve chamber 44 is a flapper 46 that is connected to an armature 48 of a torque motor 50. The torque motor 50 can be actuated to tilt the armature 48, which in turn tilts the flapper 46 towards one of the nozzles 40, 42. If the flapper 46 is tilted toward the first nozzle 40, then the valve member 24 shifts to the right (with respect to the orientation depicted in FIG. 1), opening flow between the first working port 36 and the drain port 34 and between the inlet port 30 and the second working port 38. This fluid acts against an actuator 51, which is depicted as a piston 52. In one or more embodiments, the actuator 51 is a linear actuator, such as the depicted piston 52, and in one or more other embodiments, the actuator 51 is a rotary actuator, such as a rotary vane actuator.

In the embodiment depicted, the piston 52 is disposed within a housing 54 having a first chamber 56 disposed on one side of the piston 52 and a second chamber 58 disposed on the opposite side of the piston 52. The first working port 36 is fluidly coupled to the first chamber 56 through a fourth line 60, and the second working port 38 is fluidly coupled to the second chamber 58 through a fifth line 62. As high pressure fluid $P_S$ is provided, for example, from the inlet port 30 to the second working port 38, the fluid flows through the fifth line 62 into the second chamber 58, forcing the piston 52 to the left (with respect to the orientation depicted in FIG. 1). The movement of the piston 52 decreases the volume of the first chamber 56, forcing fluid through the fourth line 60 into the first working port 36 and out of the drain port 34. The movement of the piston 52 is sensed by a position sensor of a linear actuator, which is depicted as a linear variable differential transformer (LVDT) 64. Additionally, the flapper 46 is connected to a feedback spring 66, which is connected to the valve member 24 and which senses the position of the valve member 24.

When the torque motor 50 tilts the armature 48 so that the flapper 46 blocks the second nozzle 42, the valve member 24 moves to the left within the valve bore 26. This opens fluid communication between the inlet port 30 and the first working port 36. Fluid flows from the first working port 36 through the fourth line 60 to the first chamber 56, pushing the piston 52 to the right within the valve housing 54 (with respect to the orientation depicted in FIG. 1). At the same time, fluid communication is opened between the second working port 38 and the drain port 34, allowing fluid to drain from the second chamber 58 through the fifth line 62 and out the drain port 34. When the flapper 46 is positioned intermediate of the first nozzle 40 and the second nozzle 42, both nozzles 40, 42 inject fluid into the actuator control valve chamber 44, which flows out through the drain port 34. Flow into the valve bore 26 from the inlet port 30 and from the working ports 36, 38 is blocked. Thus, in this configuration, the valve member 24 and the piston 52 are in a centered or null position.

Using the LVDT 64 and the feedback spring 66, the condition of the actuator control valve 22 can be determined and controlled to actuate the actuator 51. In such embodiments, the actuator 51 may be used to position flight control surfaces of an aircraft. In other embodiments, the actuator control valve 22 and actuator 51 may be used to regulate the flow source device 12. In such embodiments, the actuator 51 is mechanically, hydraulically, or pneumatically linked to the flow source device 12. For example, in the embodiment depicted, if the flow source device 12 is a variable displacement pump, the piston 52 is able to move the rotor or the surrounding cam ring (for a vane pump) or to change the angle of a swash plate (for a piston pump) to increase or decrease the flow supplied by the variable displacement pump flow source device 12. In one or more example embodiments, the piston 52 is electrically sensed and used to position the flow source device 12. For example, the LVDT 64 is able to control the flow output through a controller to regulate position and/or pump flow.

Because the fluid control device 20 operates using high pressure fluid $P_S$, actuation of the fluid control device 20 takes fluid put out by the flow source device 12 on the second line 16, causing a momentary decrease in flow output 18 to the downstream processes. In order to counteract this decrease in output, the flow system 10 includes a constant flow regulator 68 that provides a leak path from the flow source device 12 to a drain output 69, such as the low pressure side of the flow source device 12, a fluid reservoir (e.g., a fuel tank), or a low pressure sump.

The constant flow regulator 68 includes a pressure regulating valve 70 and a restriction 72. The pressure regulating valve 70 includes a valve member 74 that translates within a housing 76. On one side of the valve member 74 is a valve chamber 78 and a biasing member, such as a spring 80. The spring 80 biases the valve member 74 towards the closed position to control fluid flow through outlet 81. On the other side of the valve member 74 is a first inlet 82 configured to receive high pressure fluid $P_S$ from the second line 16 on the output side of the flow source device 12. The high pressure fluid $P_S$ bypasses the valve member 74 to the outlet 81 to provide a constant leakage flow. Further, the pressure regulating valve 70 includes a second inlet 84 in fluid communication with the drain port 34 of the fluid control device 20 via a sixth line 86. The second inlet 84 is also in fluid communication with a seventh line 88. Disposed in the seventh line 88 is a restriction 72 leading to the drain output 69.

As discussed in the background section, when the actuator control valve 22 of the fluid control device 20 slews, fluid from one of the working ports 36, 38 flows into the drain port 34, and high pressure fluid $P_S$ from the inlet port 30 through the other of the working ports 36, 38 actuates the piston 52. Using the high pressure fluid $P_S$ in this way could cause a disturbance in the output flow of the flow source device 12, such as was the case in conventional systems. However, here, the drain or slew flow of the fluid control device 20 is tied into the output of the pressure regulating valve 70. When the slew flow through the sixth line 86 saturates flow through the restriction 72, pressure increases in the seventh line 88, which is sensed by the pressure regulating valve 70. In response, the pressure regulator valve 70 closes off its drain port 81 reducing the flow from second line 16 through inlet 82 in an amount equal to the slew flow of the fluid control device 20. The drain port 81 is also connected to the drain output 69. As a result, the reduced leakage flow through port 81 cancels the slew flow so that the net output of the flow source device 12 remains substantially constant to the output 18 for the downstream processes.

Figure 2:
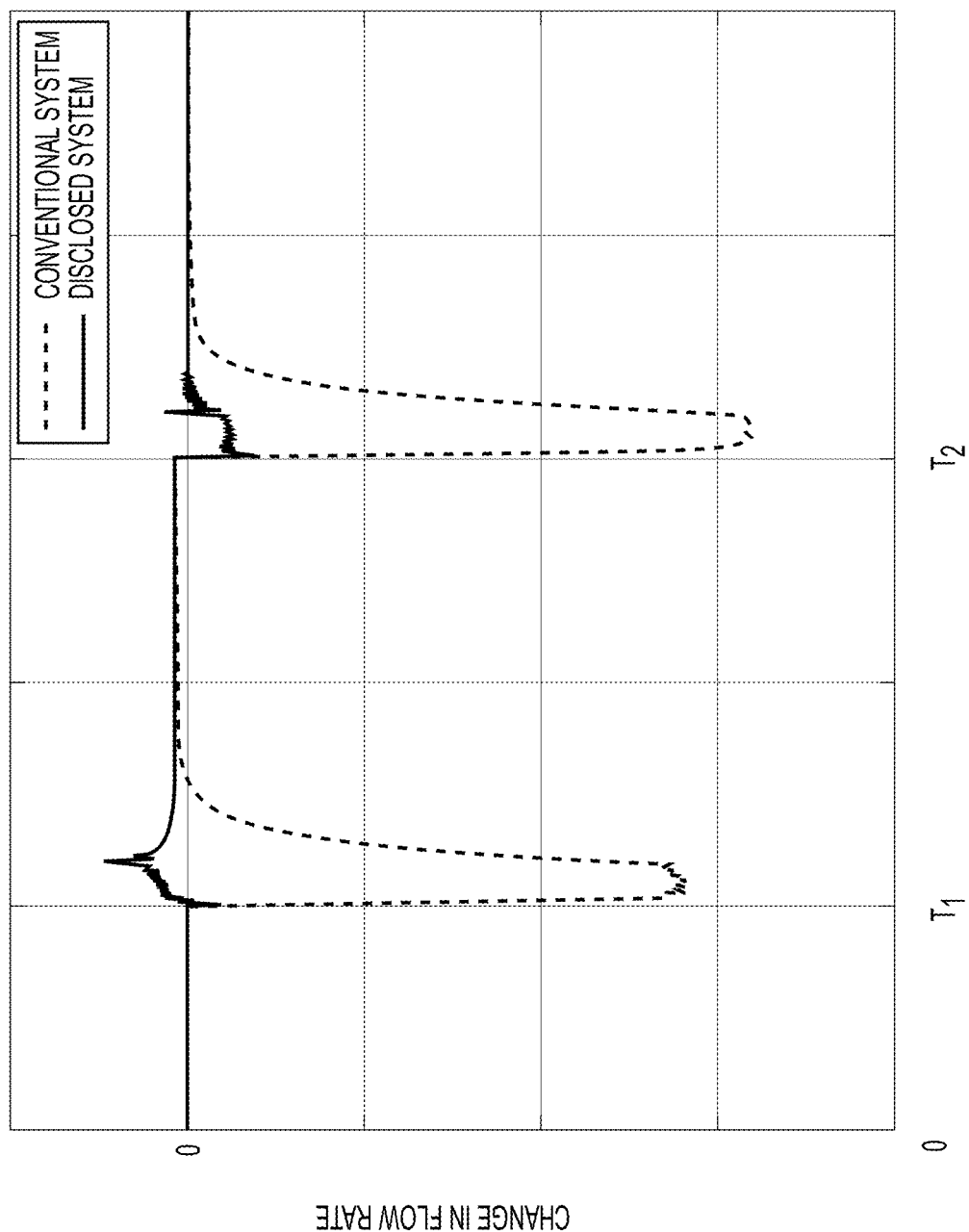
FIG. 2 is graph showing disturbances in output flow as a result of slew flow through an actuator valve for the presently disclosed variable flow system, according to an exemplary embodiment, and for a conventional variable flow system.

FIG. 2 provides a graph of the change in flow rate between the output 18 and the outlet of the flow source device 12 for a flow system 10 according to the present disclosure and for a conventional flow system. In particular, the y-axis of the graph represents the change in flow rate at the output 18 (instantaneous flow rate—initial flow rate) minus the change in flow rate at the outlet of the flow source device 12 (instantaneous flow rate—initial flow rate). The value of "0" means that the changes in flow rates at each location match. In the graph, x-axis represents time. At time, $T_1$ the fluid control device 20 is actuated in a first direction by providing current flow to the torque motor 50, and at time $T_2$, the fluid control device 20 is actuated in a second direction by providing opposite current flow to the torque motor 50.

As can be seen from the graph, the first actuation of the fluid control device at time $T_1$ causes a significant change in flow rates between the outlet of the flow control device and the output for the conventional flow system. In particular, the negative value of the change in flow rate demonstrates that the change in flow rate at the outlet of the flow source device is much greater than the change in flow rate at the output. The lower change in the flow rate at the output is attributed to the slew flow associated with actuation of the actuator control valve preventing the output from experiencing the same change in flow rate. After a period of time, the slew flow from the fluid control device ends as the actuator reaches its commanded position, and thereafter, the changes in flow rates between the output and the outlet of the flow control device equalize.

At time $T_2$, the fluid control device is again actuated (in the reverse direction), and this actuation creates slew flow through the actuator, which again creates a substantial disturbance in the flow at the output. After the slew flow ends, the changes in flow rates between the output and the outlet of the flow control system again equalize. Any further actuation of the conventional flow system would causes a similar disturbance in the rate of the flow system.

In comparison, FIG. 2 demonstrates that the changes in flow rates for the presently disclosed flow system 10 are much smaller in magnitude. In particular, at time $T_1$, the fluid control device 20 is actuated, creating a slew flow, but in contrast to the conventional flow system, the slew flow is compensated because of the leakage flow already present in the system. That is, the consistent leakage flow built into the system is replaced by the slew flow caused by actuation of the fluid control device 20. The constant flow regulator 68 provides a consistent leak path, and the pressure regulating valve 70 senses the slew flow from the fluid control device 20 and shuts off or diminishes leakage flow from the second line 16 in response to the sensed slew flow. In particular, the changes in flow rates between the output 18 and the outlet of the flow source device 12 is positive at the first actuation of the actuator control valve at time $T_1$, meaning that the change in flow rate at the output 18 is actually greater than at the outlet of the flow source device 12 primarily due to the compressibility effects of the fluid (although system size and total compressibility will affect magnitude of this phenomenon). However, even though the changes in flow rates increase, the magnitude of the changes is significantly smaller than in the conventional flow control system. Similarly, when the fluid control device 20 is actuated in the reverse direction at time $T_2$, the presently disclosed flow system 10 experiences changes in flow rates that are much smaller in magnitude than in the conventional system. In particular, the absolute value of the magnitude of the changes in flow rate is 50% or less, preferably 30% or less, more preferably 25% or less, and most preferably 20% or less, than the absolute value of the magnitude of the changes in flow rate for the conventional system.

Figure 3:
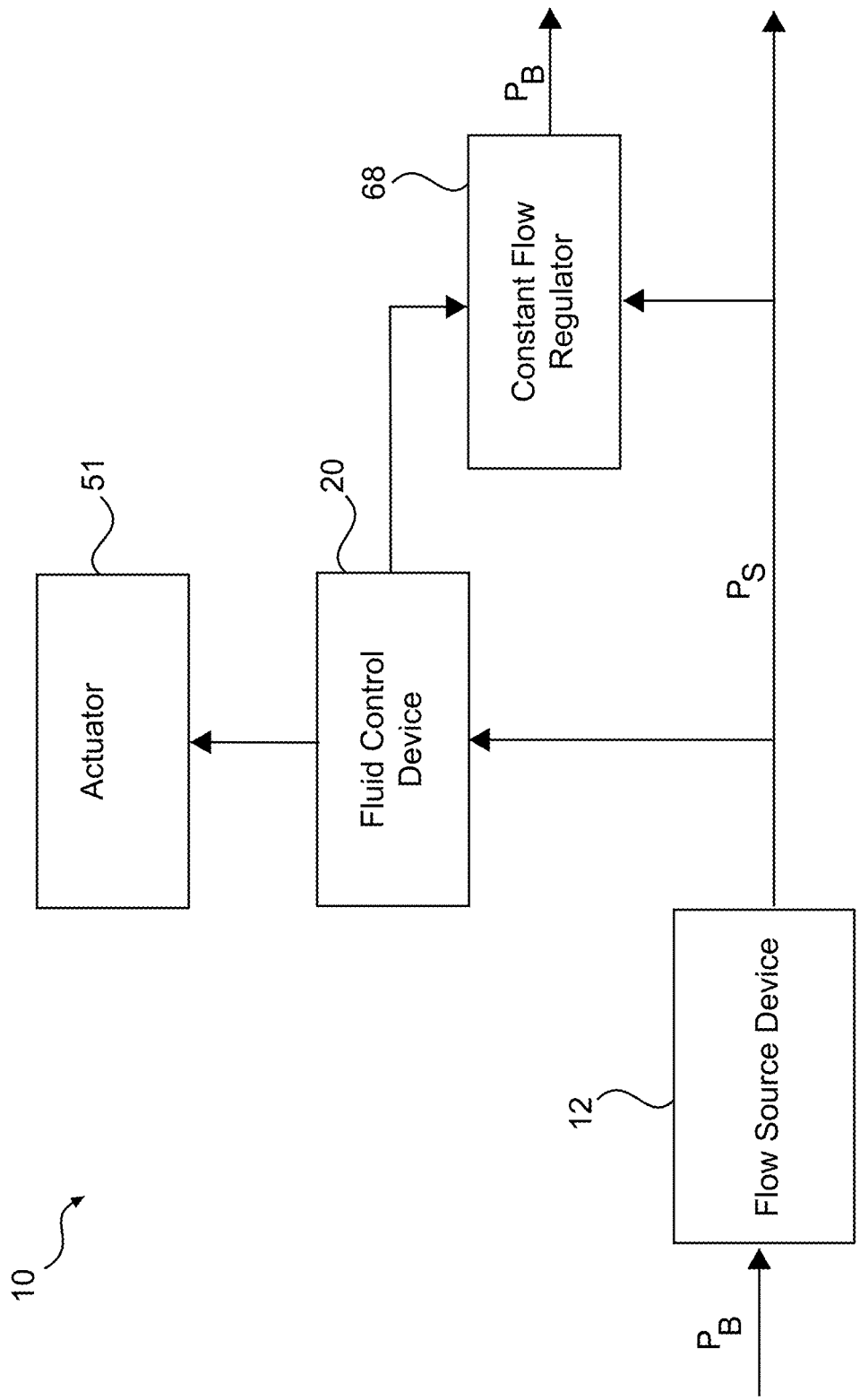
FIG. 3 depicts a generalized schematic of a variable flow system, according to an exemplary embodiment.

While the foregoing discussion related to an example implementation of the flow control system 10, the present disclosure is more broadly applicable to other types of flow control systems or other aspects within a flow control system. FIG. 3 provides a generalized schematic diagram of the flow control concept. As can be seen in FIG. 3, the flow source device 12 receives input flow of a fluid at a first pressure $P_B$ and outputs fluid flow at a second pressure $P_S$ that is higher than the first pressure. In various embodiments, the flow source device 12 is a pump, such as a variable displacement pump (e.g., a rotary vane or piston pump), or a fuel metering valve, amongst other possibilities.

The fluid control device 20 utilizes flow from the flow source device 12 to control an actuator 51. In embodiments, the fluid control device 20 is driven electro-hydraulically, electro-mechanically, pneumatically, hydraulically, or mechanically to position the actuator. In embodiments, the fluid control device 20 includes an actuator control valve 22 that is translated using, e.g., a stepper motor, a direct drive motor, or a hydro-mechanical pilot valve. For example, the actuator control valve 22 may be translated by a stepper motor having a drive shaft mechanically connected to a cam (e.g. in place of flapper 46 shown in FIG. 1) to directly position the cam in relation to the nozzles 40, 42 of the actuator control valve 22 (as shown in FIG. 1).

As discussed above, flow disturbances that would otherwise result from actuation of the fluid control device 20 are limited by the constant flow regulator 68 positioned at the outlet of the fluid control device 20. The constant flow regulator 68 provides leakage flow to a drain output, such as the inlet of the flow source device 12, a fluid reserve tank (e.g., a fuel tank), or another low pressure sump. As discussed above, the leakage flow through the constant flow regulator 68 is present regardless of the state fluid control device 20 (that is, there is always at least some leakage flow through the constant flow regulator 68). Prior to actuation of the fluid control device 20, the leakage flow is provided from the outlet of flow source device 12 through the constant flow regulator 68. When the fluid control device 20 is actuated, the slew flow associated with actuation of the fluid control device 20 replaces the leakage flow of the outlet of the flow source device 12. In this way, the reduction in the leakage flow from the outlet of the flow source device 12 compensates for fluid from the outlet of the flow source device 12 utilized to actuate the fluid control device 20.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system, comprising
a flow source device having an inlet and an outlet, the inlet configured to receive fluid at a first pressure and the outlet configured to output the fluid at a second pressure that is higher than the first pressure;
a fluid control device having an inlet port and a drain port, the inlet port of the fluid control device configured to receive flow from the outlet of the flow source device;
a constant flow regulator configured to provide a leakage flow to a drain output;
wherein the constant flow regulator is configured to decrease the leakage flow in response to an increase of flow through the drain port of the fluid control device.

2. A system, comprising
a flow source device having an inlet and an outlet, the inlet configured to receive fluid at a first pressure and the outlet configured to output the fluid at a second pressure that is higher than the first pressure;
a fluid control device having an inlet port and a drain port, the inlet port of the fluid control device configured to receive flow from the outlet of the flow source device;
a constant flow regulator configured to provide a leakage flow to a drain output;
wherein the constant flow regulator is configured to decrease the leakage flow in response to the drain port of the fluid control device; and
wherein the constant flow regulator comprises a pressure regulating valve (PRV) and a restriction, wherein the PRV comprises a PRV inlet in fluid communication with the outlet of the flow source device and a PRV outlet in fluid communication with a first fluid line extending from the drain port of the fluid control device, and wherein the restriction is positioned on a second fluid line downstream of the PRV outlet and the first fluid line.

3. The system of claim 2, further comprising an actuator, wherein the fluid control device is an electro-hydraulic servo valve (EHSV), wherein the EHSV uses fluid from the flow source device to actuate the actuator.

4. The system of claim 3, wherein the EHSV comprises:
a valve body defining a valve bore, the inlet port, the drain port, a first working port, and a second working port;
a valve member disposed within the valve bore;
wherein the valve member translates within the valve bore to provide fluid communication (i) between the inlet port and the first working port and between the second working port and the drain port or (ii) between the first working port and the drain port and between the inlet port and the second working port;
wherein fluid flow from the inlet port through the first working port actuates the actuator in a first direction and fluid flow from the inlet port through the second working port actuates the actuator piston in a second direction opposite to the first direction.

5. The system of claim 3, further comprising a position sensor configured to detect the movement of the actuator.

6. The system of claim 3, wherein the actuator is a linear actuator.

7. The system of claim 3, wherein the actuator is a rotary actuator.

8. The system of claim 4, wherein the actuator is disposed within a housing having a first chamber coupled to the first working port and a second chamber coupled to the second working port.

9. The system of claim 4, wherein the constant flow regulator decreases the leakage flow in proportion to the fluid flow from the first or second working port to the drain port.

10. The system of claim 1, wherein the fluid control device is driven by a stepper motor, a direct drive motor, or a hydro-mechanical pilot valve.

11. The system of claim 1, wherein the flow source device comprises a variable displacement pump.

12. The system of claim 11, wherein the variable displacement pump is a vane pump.

13. The system of claim 11, wherein the variable displacement pump is a piston pump.

14. The system of claim 1, wherein the flow source device is a fuel metering system.

15. A method, comprising:
receiving fluid at a first pressure at an inlet of a flow source device,
outputting the fluid at a second pressure higher than the first pressure from an outlet of the flow source device;
receiving a portion of the fluid at the second pressure through an inlet port of a fluid control device to actuate an actuator;
providing a leakage flow to a drain output through a constant flow regulator, wherein the constant flow regulator is configured to decrease the leakage flow in response to a drain flow from a drain port of the fluid control device when the actuator is actuated.

16. The method of claim 15, wherein the constant flow regulator comprises a pressure regulating valve (PRV) and a restriction and wherein the method further comprises:
providing the leakage flow from a PRV inlet in fluid communication with the outlet of the flow source device through a PRV outlet in fluid communication with a first fluid line extending from an outlet port of the fluid control device, and
restricting flow from the PRV outlet and the drain port of the fluid control device.

17. The method of claim 16, wherein the fluid control device is electro-hydraulically driven and wherein the method further comprises:
using the portion of the fluid through the inlet port of the fluid control device to move the actuator.

18. The method of claim 17, wherein the fluid control device comprises:
a valve body defining a valve bore, the inlet port, the drain port, a first working port, and a second working port; and
a valve member disposed within the valve bore;
wherein the method further comprises:
translating the valve member within the valve bore to provide fluid communication (i) between the inlet port and the first working port and between the second working port and the drain port or (ii) between the first working port and the drain port and between the inlet port and the second working port; and
moving the actuator in a first direction when fluid flows from the inlet port through the first working port or moving the actuator in a second direction when fluid flows from the inlet port through the second working port.

19. The method of claim 18, further comprising decreasing the leakage flow through the constant flow regulator in proportion to the fluid flow from the first working port to the drain port or from the second working port to the drain port.

20. The method of claim 17, wherein the actuator is linked to the flow source device and wherein the method further comprises moving a flow control member of the flow source device in response to movement of the actuator.

* * * * *